(12) United States Patent
Park et al.

(10) Patent No.: US 9,122,504 B2
(45) Date of Patent: Sep. 1, 2015

(54) APPARATUS AND METHOD FOR ENCRYPTION IN VIRTUALIZED ENVIRONMENT USING AUXILIARY MEDIUM

(71) Applicant: ELECTRONICS AND TELECOMMUNICATIONS RESEARCH INSTITUTE, Daejeon (KR)

(72) Inventors: Sung-Jin Park, Daejeon (KR); Tae-Min Ahn, Daejeon (KR); Cheol-Oh Kang, Daejeon (KR); Jeong-Seok Lim, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/081,237

(22) Filed: Nov. 15, 2013

(65) Prior Publication Data

US 2014/0157004 A1    Jun. 5, 2014

(30) Foreign Application Priority Data

Nov. 30, 2012  (KR) .................. 10-2012-0138418

(51) Int. Cl.
*G06F 12/14*  (2006.01)
*G06F 9/455*  (2006.01)
*H04L 9/08*  (2006.01)
*H04L 9/32*  (2006.01)

(52) U.S. Cl.
CPC ........ *G06F 9/45533* (2013.01); *G06F 9/45558* (2013.01); *H04L 9/0897* (2013.01); *H04L 9/3234* (2013.01); *G06F 2009/45587* (2013.01); *H04L 2209/127* (2013.01); *H04L 2209/805* (2013.01)

(58) Field of Classification Search
USPC ....................................................... 713/189
See application file for complete search history.

(56) References Cited

U.S. PATENT DOCUMENTS 8,627,112 B2 *   1/2014  Chaturvedi et al. ........... 713/193
2007/0297612 A1 * 12/2007 Feder et al. ................... 380/270
2013/0067470 A1 *  3/2013 Chen et al. ....................... 718/1

FOREIGN PATENT DOCUMENTS

KR   10-2005-0039897 A   5/2005
KR   10-2009-0067154 A   6/2009
KR   10-2011-0089942 A   8/2011
WO      2008/031148 A1   3/2008

OTHER PUBLICATIONS

Jonathan M. McCune et al., "Flicker: An Execution Infrastructure for TCB Minimization," EuroSys' 08, 2008, Glasgow, Scotland, UK.

* cited by examiner

*Primary Examiner* — Amare F Tabor
(74) *Attorney, Agent, or Firm* — LRK Patent Law Firm

(57) ABSTRACT

An apparatus and method for encryption in a virtualized environment using an auxiliary medium. The apparatus for encryption in a virtualized environment using an auxiliary medium includes a hypervisor unit for acquiring data for encryption from an auxiliary medium, and encrypting and providing protection target data of an application program using the data for encryption in response to an encryption request from the application program. A hypercall unit provides a virtualization interface between the application program and the hypervisor unit.

16 Claims, 3 Drawing Sheets

APPARATUS AND METHOD FOR ENCRYPTION IN VIRTUALIZED ENVIRONMENT USING AUXILIARY MEDIUM

CROSS REFERENCE TO RELATED APPLICATION

This application claims the benefit of Korean Patent Application No. 10-2012-0138418, filed on Nov. 30, 2012, which is hereby incorporated by reference in its entirety into this application.

BACKGROUND OF THE INVENTION

1. Technical Field

The present invention relates generally to encryption technology in a virtualized environment using an auxiliary medium and, more particularly, to an apparatus and method for encryption in a virtualized environment using an auxiliary medium, which encrypt protection target data using data for encryption stored in the auxiliary medium in response to an encryption request from an application program and provide the encrypted protection target data.

2. Description of the Related Art

Recently, as the size of programs has increased and the complexity of programs has also risen, vulnerability to the security of operating systems or application programs has increased. Due to malicious code using such security vulnerability, a problem arises in that a session key or the like used in the encryption of files may be leaked, thus resulting in a serious damage, such as the leakage of protection target data.

Generally, in order to solve the problem of the leakage of protection target data attributable to malicious code, it is necessary to enable pieces of protection target data to be implemented in an environment completely isolated from malicious code.

Korean Patent Application Publication No. 2011-0089942 presents technology for virtualizing a program and efficiently installing and executing the program in an auxiliary medium.

However, the above conventional technology neither discloses nor suggests a configuration for preventing protection target data from leaking due to malicious code by allowing a hypervisor to acquire data for encryption from an auxiliary medium in response to an encryption request from an application program through a hypervisor call for providing a virtualization interface, to encrypt the protection target data using the data for encryption and to provide the encrypted data to the application program.

Further, the conventional technology does not describe a detailed configuration in which data for encryption is received with the data encrypted using an internal key, and the encrypted data for encryption is decrypted using the internal key and then the data for encryption is acquired and is stored in a separate memory page, and in which when external access to the memory page is gained, external access is denied. Furthermore, the conventional technology does not describe a detailed configuration in which an auxiliary medium including the data for encryption, stored in an environment in which a connection to a network is not made, is used, and thus the protection target data is prevented from leaking due to malicious code from the time when the protection target data was initially recorded on the auxiliary medium. In addition, the conventional technology does not describe a detailed configuration in which an auxiliary medium including a tamper-resistant sensor is used, and thus the auxiliary medium is prevented from being physically manipulated.

Therefore, new technology for virtualization in a virtualized environment using an auxiliary medium is urgently required, which includes a configuration in which a hypervisor acquires data for encryption from an auxiliary medium in response to an encryption request from an application program through a hypervisor call for providing a virtualization interface, encrypts the protection target data using the data for encryption, and provides the encrypted data to the application program, thus preventing the protection target data from leaking due to malicious code, a configuration which receives the data for encryption with the data encrypted using the internal key, decrypts the encrypted data for encryption using the internal key, and then acquires the data for encryption, a configuration which stores the data for encryption in a separate memory page, and denies external access to the memory page when external access is gained, a configuration which uses an auxiliary medium including the data for encryption stored in an environment in which a connection to a network is not made, thus preventing the protection target data from leaking due to malicious code from the time when the protection target data was initially recorded on the auxiliary medium, and a configuration which uses an auxiliary medium including a tamper-resistant sensor, thus preventing the physical manipulation of the auxiliary medium and more securely executing an application program in the virtualized environment.

SUMMARY OF THE INVENTION

Accordingly, the present invention has been made keeping in mind the above problems occurring in the prior art, and an object of the present invention is to allow a hypervisor to acquire data for encryption from an auxiliary medium in response to an encryption request from an application program through a hypervisor call for providing a virtualization interface, encrypt the protection target data using the data for encryption, and provide the encrypted protection target data to the application program, thus providing encryption in the virtualized environment so that the data for encryption is not leaked.

Another object of the present invention is to receive data for encryption with the data encrypted using an internal key, decrypt the encrypted data for encryption using the internal key, and acquire the data for encryption, thus providing more secure encryption in the virtualized environment so that the data for encryption is not leaked.

A further object of the present invention is to store data for encryption in a separate memory page, and deny external access to the memory page when external access is gained, thus providing more secure encryption in the virtualized environment so that the data for encryption is not leaked.

Yet another object of the present invention is to use an auxiliary medium including data for encryption stored in an environment in which a connection to a network is not made, providing more secure encryption in the virtualized environment so that the data for encryption is not leaked.

Still another object of the present invention is to use an auxiliary medium including a tamper-resistant sensor, thus preventing the physical manipulation of the auxiliary medium and more securely executing an application program in the virtualized environment.

In accordance with an aspect of the present invention to accomplish the above objects, there is provided an apparatus for encryption in a virtualized environment using an auxiliary medium, including a hypervisor unit for acquiring data for encryption from an auxiliary medium, and encrypting and providing protection target data of an application program using the data for encryption in response to an encryption request from the application program; and a hypercall unit for providing a virtualization interface between the application program and the hypervisor unit.

Preferably, the hypervisor unit may include an information acquisition unit for exchanging an internal key with the auxiliary medium; and an information provision unit for encrypting and providing the protection target data in response to the encryption request from the application program.

Preferably, the exchange of the internal key may use a Diffie-Hellman algorithm.

Preferably, the information acquisition unit may receive the data for encryption from the auxiliary medium, with the data for encryption being encrypted using the internal key, decrypt the encrypted data for encryption using the internal key, and then acquire the data for encryption.

Preferably, the information acquisition unit may be configured to check integrity of the encrypted data for encryption, and if integrity of the encrypted data for encryption is found to be maintained as a result of the integrity check, decrypt the encrypted data for encryption using the internal key, and then acquire the data for encryption.

Preferably, the information acquisition unit may store the data for encryption in a separate memory page.

Preferably, the hypervisor unit may further include an external access detection unit configured to, when external access to the memory page is gained, deny external access.

Preferably, the auxiliary medium may include a processor for exchanging the internal key and encrypting the data for encryption using the internal key.

Preferably, the auxiliary medium may include the data for encryption stored in an environment in which a connection to a network is not made.

Preferably, the auxiliary medium may include a tamper-resistant sensor.

In accordance with another aspect of the present invention to accomplish the above objects, there is provided a method for encryption in a virtualized environment using an auxiliary medium, including acquiring data for encryption from an auxiliary medium; and encrypting and providing protection target data of an application program using the data for encryption in response to an encryption request from the application program.

Preferably, acquiring the data for encryption may include exchanging an internal key with the auxiliary medium.

Preferably, the exchange of the internal key may use a Diffie-Hellman algorithm.

Preferably, acquiring the data for encryption may be configured to receive the data for encryption from the auxiliary medium, with the data for encryption being encrypted using the internal key, decrypt the encrypted data for encryption using the internal key, and then acquire the data for encryption.

Preferably, acquiring the data for encryption may further include checking integrity of the encrypted data for encryption, and acquiring the data for encryption may be configured to, if integrity of the encrypted data for encryption is found to be maintained as a result of the integrity check, decrypt the encrypted data for encryption using the internal key, and then acquire the data for encryption.

Preferably, acquiring the data for encryption may be configured to store the data for encryption in a separate memory page.

Preferably, the method may further include, when external access to the memory page is gained, denying external access.

Preferably, the auxiliary medium may include a processor for exchanging the internal key and encrypting the data for encryption using the internal key.

Preferably, the auxiliary medium may include the data for encryption stored in an environment in which a connection to a network is not made.

Preferably, the auxiliary medium may include a tamper-resistant sensor.

BRIEF DESCRIPTION OF THE DRAWINGS

The above and other objects, features, and advantages of the present invention will be more clearly understood from the following detailed description taken in conjunction with the accompanying drawings, in which.

DESCRIPTION OF THE PREFERRED EMBODIMENTS

Figure 1:
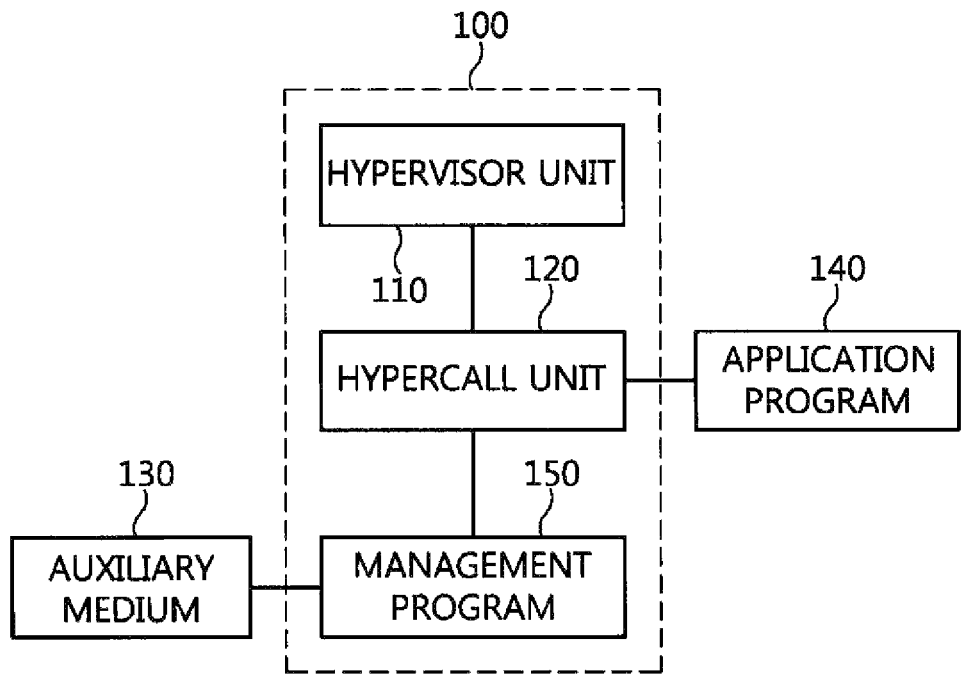
FIG. 1 is a block diagram showing an apparatus for encryption in a virtualized environment using an auxiliary medium according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

Hereinafter, preferred embodiments of the present invention will be described in detail with reference to the attached drawings.

FIG. 1 is a block diagram showing an apparatus for encryption in a virtualized environment using an auxiliary medium 130 according to an embodiment of the present invention.

Referring to FIG. 1, an apparatus 100 for encryption in a virtualized environment using an auxiliary medium 130 according to an embodiment of the present invention includes a hypervisor unit 110, a hypercall unit 120, and a management program 150.

The hypervisor unit 110 encrypts the protection target data of an application program 140 using data for encryption in response to an encryption request from the application program 140, and provides the encrypted protection target data.

In this case, the hypervisor unit 110 may be a component including a hypervisor program based on virtualization commands.

The hypercall unit 120 provides a virtualization interface between the application program 140 and the hypervisor unit 110.

The hypercall unit 120 may also provide a virtualization interface between the management program 150 and the hypervisor unit 110.

In this case, the hypercall unit 120 may provide the virtualization interfaces using a hypervisor call.

The hypercall unit 120 may transfer the protection target data from the application program 140 to the hypervisor unit 110.

Further, the hypercall unit 120 may transfer the encrypted protection target data from the hypervisor unit 110 to the application program 140.

The hypercall unit 120 may transfer the data for encryption from the management program 150 to the hypervisor unit 110.

The hypercall unit 120 may transfer the internal key from the management program 150 to the hypervisor unit 110.

In this case, the auxiliary medium 130 may include a processor for exchanging the internal key and encrypting the data for encryption using the internal key.

The auxiliary medium 130 may include the data for encryption stored in an environment in which a connection to a network is not made.

For example, the auxiliary medium 130 may include the data for encryption stored using a separate injection program not connected to the network.

In this case, the auxiliary medium 130 may include a tamper-resistant sensor.

The tamper-resistant sensor may detect whether a physical manipulation, such as a disassembly attempt, has been applied to the auxiliary medium 130.

In this case, if it is determined that physical manipulation has been applied to the auxiliary medium 130, the auxiliary medium 130 may automatically delete the protection target data stored therein.

The application program 140 may transfer the protection target data to the hypervisor unit 110 via the hypercall unit 120, and may make the encryption request.

In this case, the hypervisor unit 110 may encrypt the received protection target data using the data for encryption in, response to the encryption request.

The hypervisor unit 110 may transfer the encrypted protection target data to the application program 140 via the hypercall unit 120.

The management program 150 determines whether a user has been authenticated to use the auxiliary medium 130.

If it is determined that the user has been authenticated, the management program 150 transfers the internal key to the auxiliary medium 130 and transfers the internal key to the hypervisor unit 110 via the hypercall unit 120, thus enabling the internal key to be exchanged.

Further, if it is determined that the user has been authenticated, the management program 150 may transfer the data for encryption from the auxiliary medium 130 to the hypervisor unit 110 via the hypercall unit 120.

Figure 2:
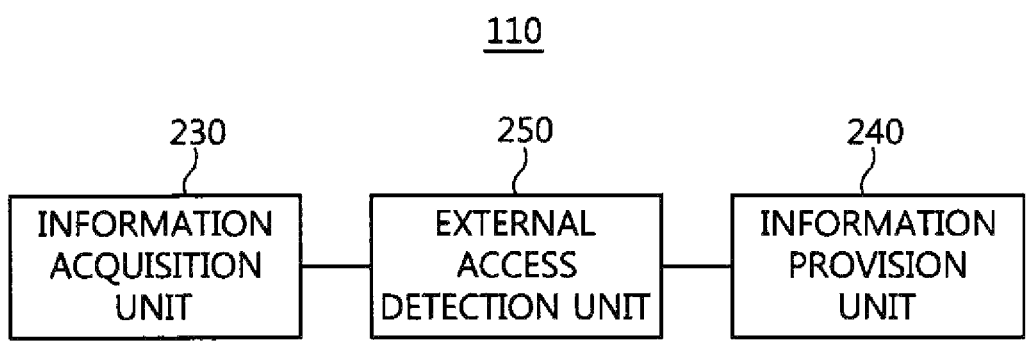
FIG. 2 is a block diagram showing an example of a hypervisor unit shown in FIG. 1.

Although not shown in FIG. 1, the hypervisor unit 110 may include an information acquisition unit 230, an information provision unit 240, and an external access detection unit 250 (see FIG. 2).

The information acquisition unit 230 exchanges an internal key with the auxiliary medium 130.

In this case, the exchange of the internal key may be implemented using a Diffie-Hellman algorithm.

The information acquisition unit 230 may receive the data for encryption from the auxiliary medium 130, with the data for encryption being encrypted using the internal key, decrypt the encrypted data for encryption using the internal key, and then acquire the data for encryption.

In this case, the information acquisition unit 230 may check the integrity of the encrypted data for encryption, and if the integrity of the encrypted data is found to be maintained as a result of the integrity check, may decrypt the encrypted data for encryption using the internal key and then acquire the data for encryption.

The information acquisition unit 230 may store the data for encryption in a separate memory page.

The information provision unit 240 encrypts and provides the protection target data in response to an encryption request from the application program 140.

The external access detection unit 250 denies external access to the memory page when external access to the memory page is gained.

FIG. 2 is a block diagram showing an example of the hypervisor unit 110 shown in FIG. 1.

Referring to FIG. 2, the hypervisor unit 110 shown in FIG. 1 includes an information acquisition unit 230, an information provision unit 240, and an external access detection unit 250.

The information acquisition unit 230 exchanges an internal key with the auxiliary medium 130.

In this case, the exchange of the internal key may be implemented using a Diffie-Hellman algorithm.

The information acquisition unit 230 may receive the data for encryption from the auxiliary medium 130, with the data for encryption being encrypted using the internal key, decrypt the encrypted data for encryption using the internal key, and then acquire the data for encryption.

In this case, the information acquisition unit 230 may check the integrity of the encrypted data for encryption, and if the integrity of the encrypted data is found to be maintained as a result of the integrity check, may decrypt the encrypted data for encryption using the internal key and then acquire the data for encryption.

The information acquisition unit 230 may store the data for encryption in a separate memory page.

The information provision unit 240 encrypts and provides the protection target data in response to an encryption request from the application program 140.

The external access detection unit 250 denies external access to the memory page when external access to the memory page is gained.

Figure 3:
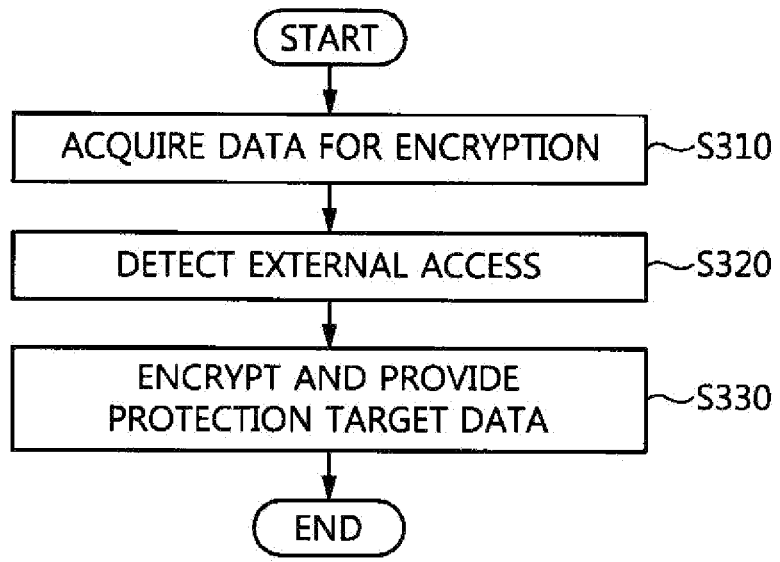
FIG. 3 is an operation flowchart showing a method for encryption in a virtualized environment using an auxiliary medium according to an embodiment of the present invention.

FIG. 3 is an operation flowchart showing a method for encryption in a virtualized environment using an auxiliary medium 130 according to an embodiment of the present invention.

Referring to FIG. 3, in the method for encryption in the virtualized environment using the auxiliary medium 130 according to the embodiment of the present invention, data for encryption is acquired from the auxiliary medium 130 at step S310.

Step S310 may include the step of exchanging an internal key with the auxiliary medium 130.

The auxiliary medium 130 may include a processor for exchanging the internal key and encrypting the data for encryption using the internal key.

The auxiliary medium 130 may include data for encryption stored in an environment in which a connection to a network is not made.

For example, the auxiliary medium 130 may include the data for encryption stored using a separate injection program not connected to the network.

In this case, the auxiliary medium 130 may include a tamper-resistant sensor.

The tamper-resistant sensor may detect whether a physical manipulation, such as a disassembly attempt, has been applied to the auxiliary medium 130.

If it is determined that physical manipulation has been applied to the auxiliary medium 130, the auxiliary medium 130 may automatically delete the protection target data stored therein.

In this case, the exchange of the internal key may be implemented using a Diffie-Hellman algorithm.

Further, step S310 may be configured to acquire the protection target data encrypted using the internal key from the auxiliary medium 130.

In detail, step S310 may be configured to receive the data for encryption from the auxiliary medium 130, with the data for encryption being encrypted using the internal key, decrypt the encrypted data for encryption using the internal key, and then acquire the data for encryption.

Step S310 may further include the step of checking the integrity of the encrypted data for encryption. In this case, if the integrity of the encrypted data is found to be maintained as a result of the integrity check, the encrypted data for encryption may be decrypted using the internal key and then the data for encryption may be acquired.

Step S310 may be configured to store the data for encryption in a separate memory page.

Next, in the method for encryption in the virtualized environment using the auxiliary medium 130 according to the embodiment of the present invention, when external access to the memory page is gained, external access is denied at step S320.

Then, in the method for encryption in the virtualized environment using the auxiliary medium 130 according to the embodiment of the present invention, the protection target data is encrypted using the data for encryption, and the encrypted protection target data is provided to the application program at step S330.

Figure 4:
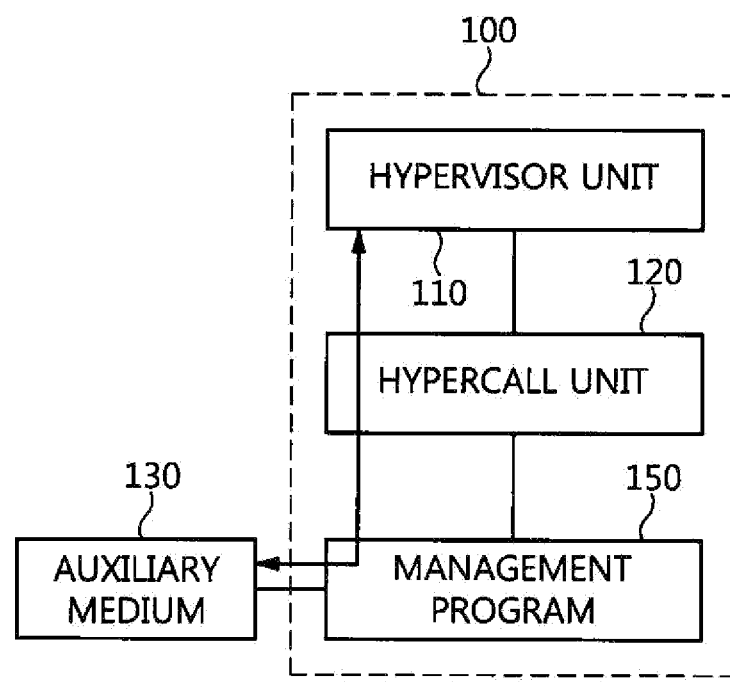
FIG. 4 is a diagram showing an example of the exchange of an internal key according to the present invention.

FIG. 4 is a diagram showing an example of the exchange of an internal key according to the present invention.

Referring to FIG. 4, it can be seen that the exchange of an internal key according to the present invention is to transfer the internal key to the hypervisor unit 110 and to the auxiliary medium 130 and is performed by the management program 150.

The hypercall unit 120 provides a virtualization interface between the management program 150 and the hypervisor unit 110.

In this case, the management program 150 may determine whether a user has been authenticated to use the auxiliary medium 130.

The management program 150 is configured to, if the user is determined to have been authenticated, transfer the internal key to the auxiliary medium 130 and also transfer the internal key to the hypervisor unit 110 via the hypercall unit 120, thus enabling the exchange of the internal key to be performed.

Further, if the user is determined to have been authenticated, the management program 150 may transfer the data for encryption from the auxiliary medium 130 to the hypervisor unit 110 via the hypercall unit 120.

Figure 5:
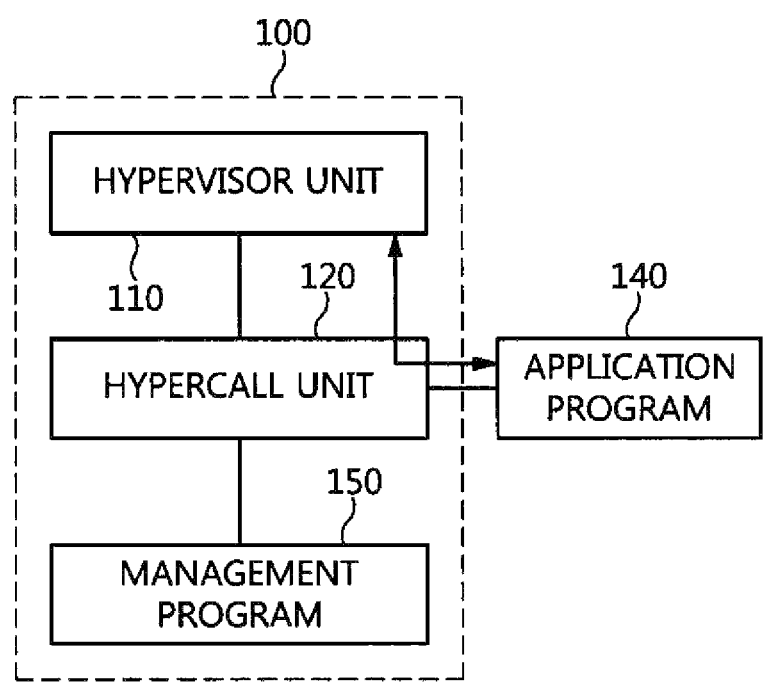
FIG. 5 is a diagram showing an example of the encryption of protection target data according to the present invention.

FIG. 5 is a diagram showing an example of the encryption of protection target data according to the present invention.

Referring to FIG. 5, it can be seen that the encryption of protection target data according to the present invention is to transfer encrypted protection target data to the application program 140, and is performed by the hypervisor unit 110.

The hypercall unit 120 provides a virtualization interface between the application program 140 and the hypervisor unit 110.

In this case, the application program 140 may transfer the protection target data to the hypervisor unit 110 via the hypercall unit 120, and may make an encryption request.

In this case, the hypervisor unit 110 may encrypt the received protection target data using the data for encryption in response to the encryption request.

The hypervisor unit 110 may transfer the encrypted protection target data to the application program 140 via the hypercall unit 120.

In accordance with the present invention, the present invention allows a hypervisor to acquire data for encryption from an auxiliary medium in response to an encryption request from an application program through a hypervisor call for providing a virtualization interface, encrypt the protection target data using the data for encryption, and provide the encrypted protection target data to the application program, thus providing encryption in the virtualized environment so that the data for encryption is not leaked.

Further, the present invention can receive data for encryption with the data encrypted using an internal key, decrypt the encrypted data for encryption using the internal key, acquire the data for encryption, store the data for encryption in a separate memory page, and deny external access to the memory page when external access is gained, thus providing more secure encryption in the virtualized environment so that the data for encryption is not leaked.

Furthermore, the present invention can use an auxiliary medium including data for encryption stored in an environment in which a connection to a network is not made, thus providing more secure encryption in the virtualized environment so that the data for encryption is not leaked.

Furthermore, the present invention can use an auxiliary medium including a tamper-resistant sensor, thus preventing the physical manipulation of the auxiliary medium and more securely executing an application program in the virtualized environment.

As described above, in the apparatus and method for encryption in the virtualized environment using the auxiliary medium according to the present invention, the configurations and schemes in the above-described embodiments are not limitedly applied, and some or all of the above embodiments can be selectively combined and configured so that various modifications are possible.

What is claimed is:

1. An apparatus for encryption in a virtualized environment using an auxiliary medium, comprising:
a hypervisor unit for acquiring data for encryption from an auxiliary medium, and encrypting and providing protection target data of an application program using the data for encryption in response to an encryption request from the application program; and
a hypercall unit for providing a virtualization interface between the application program and the hypervisor unit,
wherein the hypervisor unit comprises:
an information acquisition unit for exchanging an internal key with the auxiliary medium to acquire the data for encryption; and
an information provision unit for encrypting and providing the protection target data in response to the encryption request from the application program, and
wherein the information acquisition unit is configured to check integrity of the data for encryption being encrypted using the internal key, and if integrity of the encrypted data for encryption is found to be maintained as a result of the integrity check, decrypt the encrypted data for encryption using the internal key, and then acquire the data for encryption.

2. The apparatus of claim 1, wherein the exchange of the internal key uses a Diffie-Hellman algorithm.

3. The apparatus of claim 2, wherein the information acquisition unit receives the data for encryption from the auxiliary medium, with the data for encryption being encrypted using the internal key, decrypts the encrypted data for encryption using the internal key, and then acquires the data for encryption.

4. The apparatus of claim 3, wherein the information acquisition unit stores the data for encryption in a separate memory page.

5. The apparatus of claim 4, wherein the hypervisor unit further comprises an external access detection unit configured to, when external access to the memory page is gained, deny external access.

6. The apparatus of claim 5, wherein the auxiliary medium comprises a processor for exchanging the internal key and encrypting the data for encryption using the internal key.

7. The apparatus of claim 6, wherein the auxiliary medium includes the data for encryption stored in an environment in which a connection to a network is not made.

8. The apparatus of claim 7, wherein the auxiliary medium comprises a tamper-resistant sensor.

9. A method for encryption in a virtualized environment using an auxiliary medium, comprising;
  acquiring data for encryption from an auxiliary medium; and
  encrypting and providing protection target data of an application program using the data for encryption in response to an encryption request from the application program, wherein acquiring the data for encryption comprises exchanging an internal key with the auxiliary medium and checking integrity of the data for encryption being encrypted using the internal key, and
  wherein acquiring the data for encryption is configured to, if integrity of the encrypted data for encryption is found to be maintained as a result of the integrity check, decrypt the encrypted data for encryption using the internal key, and then acquire the data for encryption.

10. The method of claim 9, wherein the exchange of the internal key uses a Diffie-Hellman algorithm.

11. The method of claim 10, wherein acquiring the data for encryption is configured to receive the data for encryption from the auxiliary medium, with the data for encryption being encrypted using the internal key, decrypt the encrypted data for encryption using the internal key, and then acquire the data for encryption.

12. The method of claim 11, wherein acquiring the data for encryption is configured to store the data for encryption in a separate memory page.

13. The method of claim 12, further comprising, when external access to the memory page is gained, denying external access.

14. The method of claim 13, wherein the auxiliary medium comprises a processor for exchanging the internal key and encrypting the data for encryption using the internal key.

15. The method of claim 14, wherein the auxiliary medium includes the data for encryption stored in an environment in which a connection to a network is not made.

16. The method of claim 15, wherein the auxiliary medium comprises a tamper-resistant sensor.

* * * * *